United States Patent [19]
Sturhan

[11] 3,984,078
[45] Oct. 5, 1976

[54] VEHICLE SEAT

[75] Inventor: Klaus Sturhan, Lemgo, Germany

[73] Assignee: Gebr. Isringhausen, Lemgo, Germany

[22] Filed: Feb. 19, 1976

[21] Appl. No.: 659,543

[30] Foreign Application Priority Data
Feb. 26, 1975 Germany............................ 2508186

[52] U.S. Cl................................. 248/399; 248/421
[51] Int. Cl.²........................................... B60N 1/02
[58] Field of Search........................... 248/372–381, 248/399, 400, 157, 421; 297/337–339, 344, 345, 347, 348

[56] References Cited
UNITED STATES PATENTS

| | | | |
|---|---|---|---|
| 1,769,434 | 7/1930 | Jones................................. | 248/399 |
| 2,772,721 | 12/1956 | Saunders............................ | 248/421 |
| 2,862,689 | 12/1958 | Dalrymple et al. ............. | 248/421 X |
| 3,823,932 | 7/1974 | Simons............................ | 248/374 X |
| 3,826,457 | 7/1974 | Huot de Longchamp.......... | 248/399 |
| 3,888,451 | 6/1975 | Lacey ................................ | 248/399 |

FOREIGN PATENTS OR APPLICATIONS

| | | | |
|---|---|---|---|
| 1,135,786 | 8/1962 | Germany........................... | 297/345 |
| 486,742 | 11/1953 | Italy.................................. | 248/377 |
| 537,098 | 6/1941 | United Kingdom................ | 248/421 |
| 1,278,921 | 6/1972 | United Kingdom................ | 248/399 |
| 1,327,636 | 8/1973 | United Kingdom................ | 248/399 |

Primary Examiner—Lawrence J. Staab
Attorney, Agent, or Firm—Salter & Michaelson

[57] ABSTRACT

A vehicle seat that is adjustable in accordance with the weight of the occupant and that includes a frame on which are mounted scissor guides and a spring and damping unit that enables the scissor guides and seat to be adjustably moved to a desired position within a limited travel.

3 Claims, 5 Drawing Figures

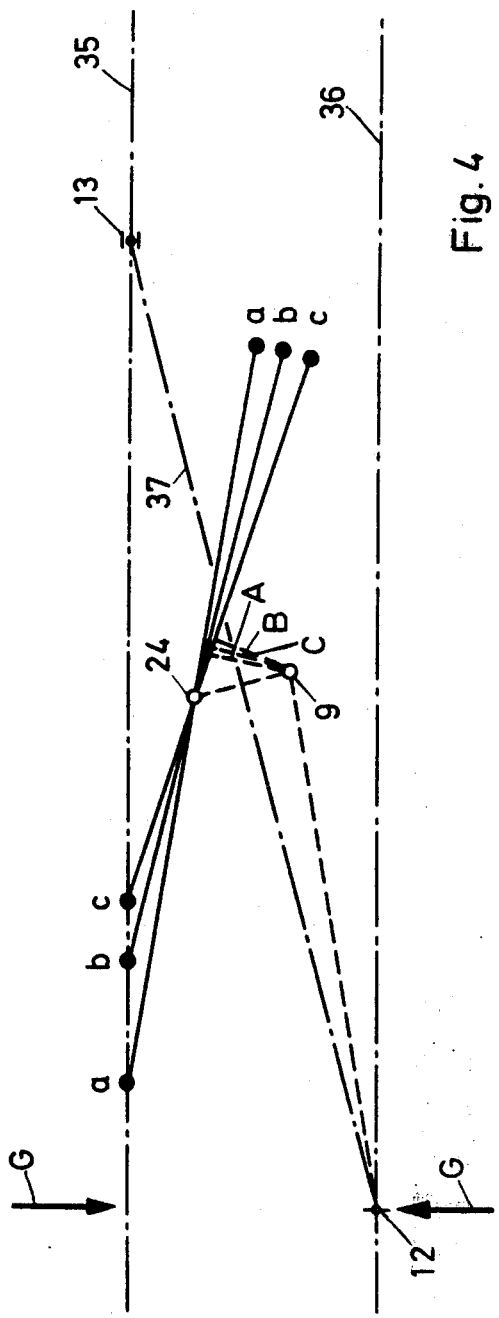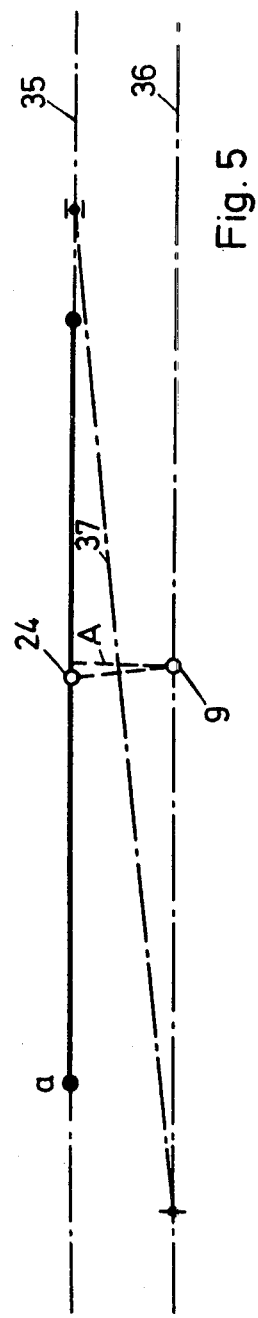
Fig. 4
Fig. 5

VEHICLE SEAT

BACKGROUND OF THE INVENTION

The invention is directed to a vehicle seat of the type illustrated and described in British Pat. No. 1,327,636 and is suitable for use in utility vehicles and machines. The spring properties of the seat can be adjusted by a rotating spindle in accordance with the weight of the user by varying, for example, the initial stress of a spring and damping unit.

The use of such vehicle seats is difficult to adapt to vehicles or machines which have only limited installation possibilities, as is the case, for example, of smaller driver's cabins or in passenger cars. With a reduced mounting height it is difficult in constructional respect to accommodate a spring and damping unit with the required length and to insure at the same time that this is sufficient spring travel during the swinging of the seat. In addition, a progressively increasing restoring force of the swing system is required with a small swing stroke, so that the seat does not break down. The problem is therefore to provide a vehicle seat of the above mentioned type which has a very low overall height, while improving the progressive spring properties thereof.

SUMMARY OF THE INVENTION

The problem as stated hereinabove is solved by the invention as described hereinafter. A spring and damping unit is secured at one end to the bottom of a mount that is open at the front, and that is connected by lateral pivots with the inner scissor guides in spaced relation from their swivel pins. This permits tilting of the entire spring and damping unit when the system swings in. The spring and damping unit assumes the optimum diagonal position with the system fully extended, and lies flat in the upper seat frame with the system fully retracted. In this way sufficient room is provided, despite the low mounting height, for accommodating the spring and damping unit with the required length. By forming the outer dimensions of the seat frame somewhat smaller than the bottom frame, so that the top frame can dip into the bottom frame during the swinging, and by symmetrically pivoting the mount and the swivel pins of the scissor guides at both sides of a straight line extending through the bearing axes of the inner scissor guides, the swing system has an extremely low mounting height in the fully retracted state, which does not exceed, for example, the 1.5- to 1.7-fold amount of the thickness of the frame beams.

When the spring and damping unit is tilted, it should always be aligned with the mount on the bottom of which it is secured. It is therefore advantageous if the amount is equipped with a supporting guide which can be provided, for example, by lateral mandrels which pass by the spring and damping unit. The mount can preferably also be designed as a pocket which encloses the spring and damping unit. The pocket protects the spring and damping unit at the same time against excess fouling.

If the pivots of the mount are in the front range of the vehicle seat as described hereinafter, the tilting of the spring and damping unit also results in the desired improvement of the prgressive spring properties.

Other objects, features and advantages of the invention will become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 4 shows in a schematic representation functions of the swing-system according to FIGS. 1 to 3 in the extended state; and FIG. 5 shows in a schematic representation functions of the swing-system according to FIGS. 1 to 3 in the fully retracted state.

DESCRIPTION OF THE INVENTION

Figure 1:
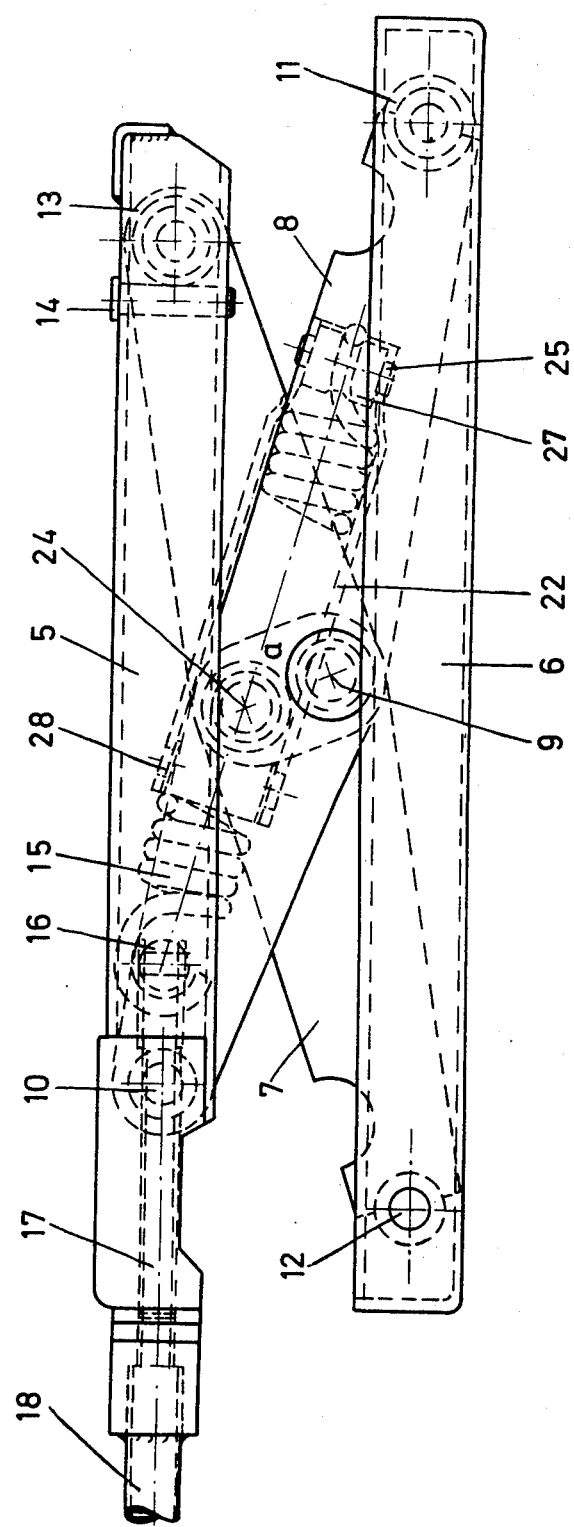
FIG. 1 shows a side view of the swing-system of a vehicle seat according to the invention in the extended state.

Referring now to the drawings and particularly to FIG. 1, the swing-system of the present invention is shown including a seat frame 5, which carries a cushion (not shown) and which bears over scissor guides 7 and 8 arranged thereon at both sides on a bottom frame 6 associated with the body of a vehicle. One side of the scissor guides 7 and 8 are connected with each other at their intersections by swivel pins 9. Scissor guide 8 is fixed in seat frame 5 on journal 10, while the other end of scissor guide 8 is displaceably mounted in bottom frame 6 by means of a roller 11. The same holds true for scissor guide 7, which is fixed in bottom frame 6 on journal 12 and is displaceably mounted in seat frame 5 by means of roller 13. Roller 13 strikes in the fully extended position of the swing system against a cotter pin 14 which thus limits the maximum swing stroke of the system. This cotter pin 14 can be easily displaced so that the maximum swing stroke can be adapted to the respective type of vehicle.

Figure 2:
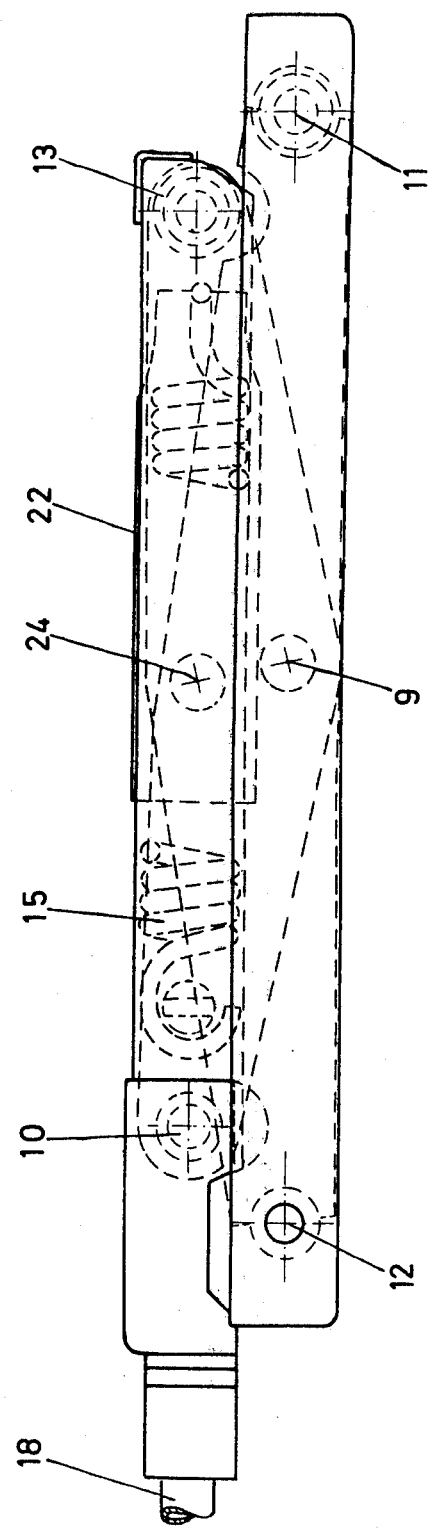
FIG. 2 shows a side view of the swing-system according to FIG. 1 in the fully retracted state.

The swinging of the system from the position shown in FIG. 1 into the position shown in FIG. 2 is carried out against the force of two tension springs 15. The tension springs are connected over a crossbeam 16, which is articulated on a draw spindle 17. This draw spindle can be shifted in its axial direction by rotating spindle sleeve 18 by means of a hand wheel, hand lever, etc. In seat frame 5 is welded a guide fork 19 which secures crossbeam 16 against turning. Naturally, any other suitable constructions can be used for shifting the crossbeam.

Connected parallel to the tension springs 15 is a shock absorber 20 to further improve the swing characteristics of the system. In the present embodiment, the shock absorber is arranged in the axis of symmetry of the seat and is articulated with its end on a tension strap 21 which is secured on crossbeam 16. The ends of this tension strap 21 are overlapped by the tension springs 15, and a sliding material is arranged between the tension strap and cross beam 16. This way the tilting movements of the spring and damping unit occurring during the swinging of the system do not lead to excessive wear in their fastening range on seat frame 5.

The other end of the spring and damping unit 15, 20 is articulated on the bottom of a thrust pin pocket 22 which is open at the front. The spring thrust pin 22 is very flat, and its side parts 23 are connected over pivots 24 with the inner scissor guides 7. On the bottom of the pocket the springs 15 are secured by means of a roller 27 and a pin 25. Shock absorber 20 is fixed on the bottom of the pocket by means of a screw bolt 26.

The thrust pin pocket 22 is raised relatively far over the length of the spring and damping unit 15, 20 and has at its upper end supporting jaws 28 which are arranged between the tension springs 15 and the wall of the thrust pin pocket, and which support the springs 15 from the top to the bottom in the manner as shown in FIG. 1. This has the effect that the tension springs 15 are always aligned with the mount and the thrust pin pocket 22, respectively, so that no undesirable torque acting on the thrust pin pocket can be formed around the pivots 24.

In the extended state of the swing system, the thrust pin pocket is in the diagonal position according to FIG. 1. When the system swings in, the thrust pin pocket is tilted increasingly about its pivots 24 so that it assumes a horizontal position in seat frame 5 in the fully retracted state of the system, according to FIG. 2. FIG. 2 also shows clearly the extremely flat mounting height of the swing system, which is lower in the fully retracted state than the added heights of seat frame 5 and bottom frame 6.

Figure 3:
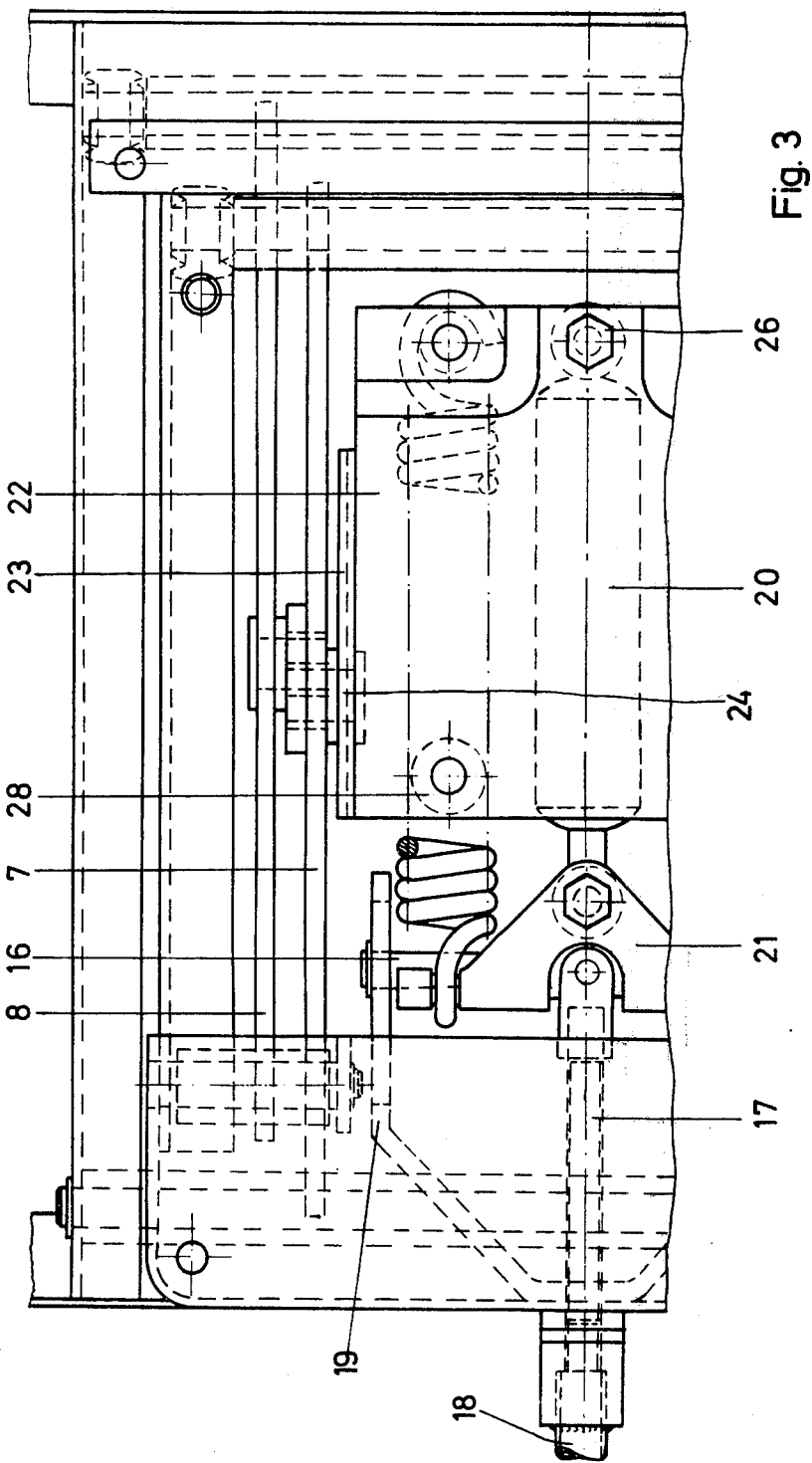
FIG. 3 shows a top view of the swing-system according to FIGS. 1 and 2.

FIGS. 4 and 5 show the sequence of operations of the swing system according to FIGS. 1 to 3. The two horizontal lines 35 and 36 represent the center lines of seat frame 5 and bottom frame 6, respectively. The diagonal line 37 corresponds to the center line of the inner scissor guide 7, which extends through the bearing axes 12 and 13 of the inner scissor guide 7 in seat frame 5 and in bottom frame 6, respectively. The inner scissor guide 7 intersects the outer scissor guide 8 (not shown) and is connected with the latter in the intersection above the swivel pins 9.

On the inner scissor guide 7 there is secured by means of a pivot 24 the spring and damping unit, which is represented in FIG. 4 in three positions, namely, a—a, b—b, and c—c. The positions correspond each to an initial stress of the spring and damping unit adjusted by means of draw spindle 17 (FIGS. 1 and 3), which should be greater for a heavy seat user (e.g., a—a) than for a light-weight seat user (e.g., c—c). Corresponding to the respective initial stress, a restoring moment acts on swivel pin 9 of the swing-system, whose size can be calculated by multiplying the spring tension by the respective lever arm length A, B or C which is perpendicular to the direction of tension a—a, b—b, or c—c. It can be seen from FIG. 4 that when a greater initial stress of the spring and damping unit is selected, the restoring moment acting on swivel pin 9 increases progressively, since the effective lever arm increases at the same time by the tilting of the spring and damping unit about its pivots 24.

This progressive restoring moment, which can be adjusted with the spring and damping unit, can be further improved by the fact that the active lever arm length A, B or C increases during the swinging of the system and during the corresponding tilting of the spring and damping unit. FIG. 5 shows the swing system in the fully retracted state in which the spring and damping unit is flat in the seat frame. The effective lever arm $a$ is considerably increased compared to lever arm A in FIG. 5 corresponding to the position a—a of the spring and damping unit. The restoring moment acting on swivel pin 9 thus also increases progressively by the swinging of the system.

Simultaneously with the swinging of the system, pivot 24 is moved to the right as shown in FIGS. 4 and 5 so that the desired longitudinal change of the spring and damping unit is achieved during the swinging of the system.

Another advantage of the swing-system results from the optimization of the ratio of the load moment to restoring moment. The load moment results from the weight G (FIG. 4) of the seat user and can be compared to the swivel pin 9 directly with the restoring moment resulting from the spring and damping unit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A spring mounted seat for a vehicle comprising a seat frame on which a cushion is mounted, a bottom frame located on the body of the vehicle, a pair of scissor guides, each guide including first and second intersecting guide members pivotally connected at their intersection by swivel pins, opposite end portions of each of said guide members being secured respectively to said seat frame and said bottom frame by pivot means to thereby allow said seat frame to move vertically relative to said bottom frame, a spring and damping unit mounted on said seat frame and including tension springs and a shock absorber to one end of which is connected a cross beam, said crossbeam being mounted on said seat frame adjacent to the front end thereof for longitudinal adjustment, the other end of said spring and damping unit being pivotally connected to the bottom part of a mount, the front portion of said mount having an opening therein receiving said spring and damping unit, said mount having side parts that are pivotally connected to one of said first and second scissor guide members, said swivel pins of the scissor guides and the pivot connections of the mount being located on opposite sides of a straight line which extends through the axes of the pivot means which secures said one of said first and second guide members to said frames.

2. A vehicle seat according to claim 1, characterized in that the swivel pins of the scissor guides and the pivot connections of the mount are arranged symmetrically on both sides of the straight line that extends through the axes of said one of said first and second guide members.

3. A vehicle seat according to claim 2, characterized in that the mount defines a pocket in which the spring and damping unit is enclosed.

* * * * *